United States Patent [19]

Leiber

[11] Patent Number: 4,711,266

[45] Date of Patent: Dec. 8, 1987

[54] VALVE ARRANGEMENT

[75] Inventor: Heinz Leiber, Oberriexingen, Fed. Rep. of Germany

[73] Assignee: Robert Bosch GmbH, Stuttgart, Fed. Rep. of Germany

[21] Appl. No.: 415,613

[22] Filed: Sep. 3, 1982

[30] Foreign Application Priority Data

Apr. 7, 1982 [DE] Fed. Rep. of Germany ....... 3213008

[51] Int. Cl.$^4$ ..................... F16K 37/00; F16K 31/02
[52] U.S. Cl. .................. 137/554; 137/625.65; 137/625.26; 251/129.15; 251/210
[58] Field of Search ............ 137/554, 625.65, 625.26, 137/516.25; 251/129.15, 210

[56] References Cited

U.S. PATENT DOCUMENTS

| 2,638,108 | 5/1953 | Williams et al. | 137/625.26 |
| 3,522,821 | 8/1970 | Komendera | 137/625.26 |
| 4,040,445 | 8/1977 | McCormick | 137/625.65 |
| 4,286,626 | 9/1981 | Leiber | 137/625.65 |
| 4,312,380 | 1/1982 | Leiber | 137/625.65 |

FOREIGN PATENT DOCUMENTS

| 1169236 | 4/1964 | Fed. Rep. of Germany | 137/625.65 |
| 1079915 | 8/1967 | United Kingdom | 137/625.65 |
| 2021240 | 11/1979 | United Kingdom | 137/625.65 |

Primary Examiner—Alan Cohan
Assistant Examiner—John Rivell
Attorney, Agent, or Firm—Edwin E. Greigg

[57] ABSTRACT

A valve arrangement which assumes at least two positions and a monitoring system which is to monitor the functional performance of the valve arrangement. A valve closing body is connected to a slider which slides in sealing fashion in the opening to be closed by the valve closing body so that the opening is not set free until after lifting of the valve closing body and the slide sets free the opening.

6 Claims, 3 Drawing Figures

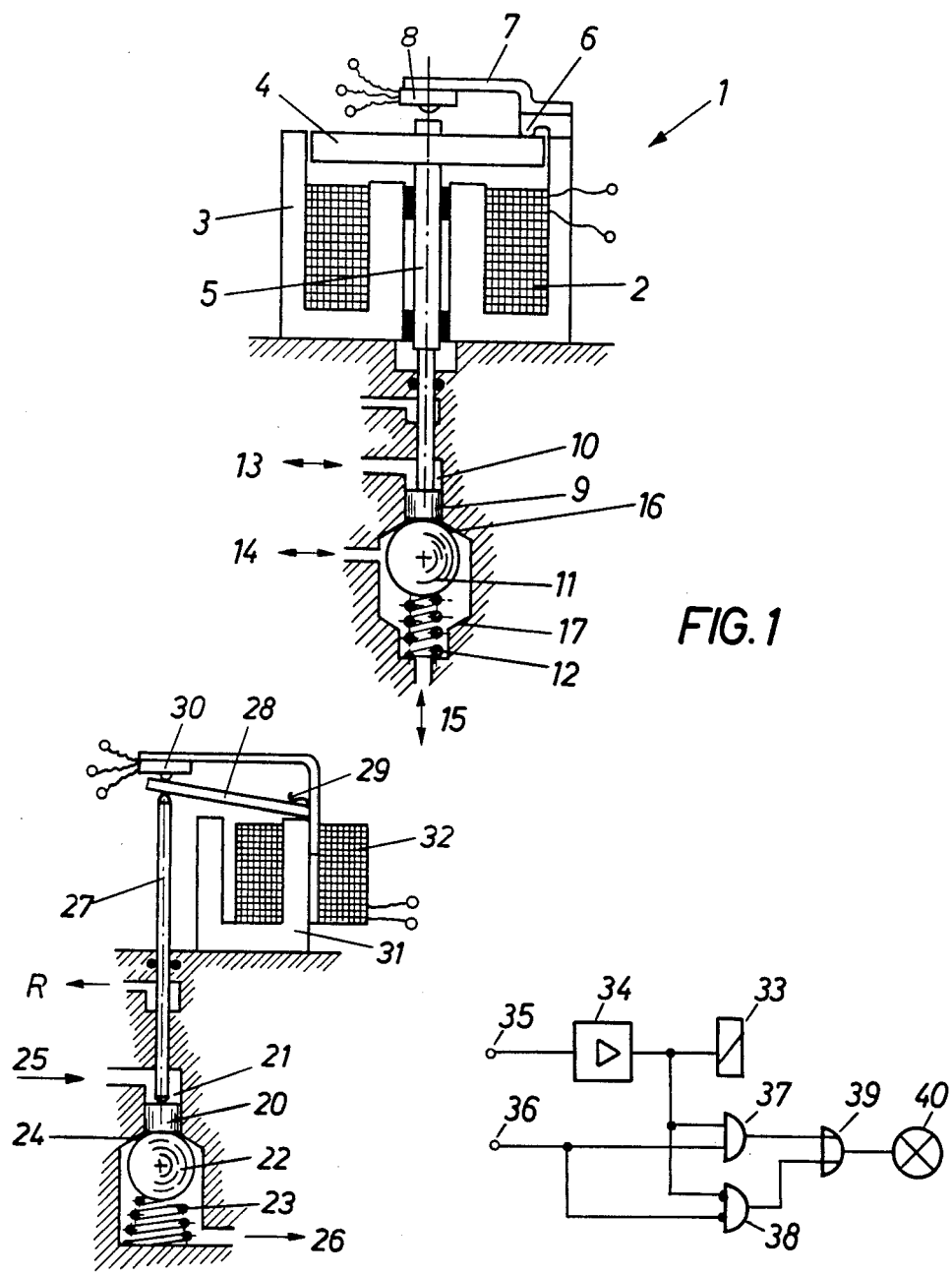

VALVE ARRANGEMENT

BACKGROUND OF THE INVENTION

The invention concerns a valve arrangement which may occupy at least two positions for the purpose of pressure control and which is associated with a control apparatus by which the operability of the valve arrangement may be controlled. The valve arrangement may particularly be utilized in an anti-locking control system, such as described in U.S. Pat. No. 4,005,910.

Systems are already known in which valve arrangements are used, the failure of which causes a breakdown of the overall system. This in turn greatly jeopardizes the safety of persons.

An acute danger of accident may thus arise when a valve arrangement in an anti-locking system fails to operate in the desired manner. This is, for example, the case with an anti-locking system possessing an intake and an outlet valve when the intake valve fails to release the brake line upon actuation or even more when the outlet valve fails to close resulting in no pressure on the brake. The malfunctioning of a check valve, for example one which either bridges the intake valve or is inserted into the return supply line, may disrupt the operation of the system and herewith conjure up the danger of an accident. The danger of a failure is further increased by the fact that these parts, those of an anti-locking system, are relatively rarely actuated, namely only with locking danger.

It has therefore been proposed to actuate the valves with each starting of the vehicle in a control process and additionally to examine, with the aid of a monitoring apparatus, whether actuation of the valve has really taken place. In the aforementioned case, the valve arrangement is a so-called modulator in which a flexible wall, which may be shifted through pressure admission, closes a valve located in the brake line when locking is imminent and enlarges the expansion chamber for the pressure medium which is housed between this valve and the wheel brake cylinders. The functionally appropriate movement of the flexible wall is monitored by means of a switch and a monitoring apparatus.

The underlying mission of the invention is to extend this fundamentally known potential of monitoring from valve arrangements to seating valves.

This mission is accomplished through the features set forth herein.

With seating valves, the distance which the valve closing body travels between the "valve closed" and "valve already penetrable" positions is very short even when the distance to the terminal position "valve open" is long by choice. It is therefore difficult, particularly with consideration of valve tolerances, to detect the position "valve totally closed" by measuring techniques. Th solve this problem the invention suggests a combination of a seating valve and a slide which on the one hand exhibits a slight leakage flux and on the other hand a comparatively large and therewith easily determinable (by measuring technique) distance between a closed position and "valve beginning to open".

The ideas according to the invention may be employed with magnetically actuatable valves but also with pressure controlled valves such as check valves. In order to control the functional performance of such a check valve one supplements it with a preferably electromagnetically actuatable operating device which one activates from time to time. The reaction of the valve is monitored by measuring technique.

With the aforementioned magnet valve just as with the electromagnetically actuatable operating device one may separate the magnetic part from the hydraulic or pneumatic parts respectively. The combination valve closing body/slide becomes actuated here over a tappet.

Exemplified embodiments of the invention are expanded upon with the aid of the drawing.

FIG. 1 exhibits a 3/2 magnet valve constructed according to the invention.

FIG. 2 exhibits a check valve according to the invention.

FIG. 3 exhibits a possible monitoring circuit.

DETAILED DESCRIPTION

In the upper part of FIG. 1, an electromagnet 1 is shown which consists of a cup-shaped stator 3 of soft iron with a coil 2 and an armature 4 which is connected to a rod 5 and which armature lies against a detent 6 when the electromagnetic is not actuated. A arm 7 carries a sensor 8, for example a field plate which reacts to the distance of armature 4 or rod 5 respectively and indicates whether the armature is positioned in the starting position or in one which deviates from the starting position.

The rod 5 is connected to a small slide 9 which is adapted into an opening 10. A valve closing body in the form of a ball 11 is connected to the slide 9 and a spring 12 acts upon the ball. The valve has three fluid line connections 13–15. Two seats 16 and 17 are provided for the ball 11.

In the starting position, the connection 14 is joined with the connection 15 through the chamber containing ball 11. The connection 13 is sealed against the other connections. For instance, the main brake cylinder, should be connected at 15, and the one or more wheel brake cylinder(s) should be connected at 14, and the return channel of an anti-blocking system may be connected at 13. The assumption of this position may be determined and communicated by means of sensor 8.

When the valve is activated, armature 4 is drawn into the electromagnet 1. Herewith ball 11 is forced from its seat and upon further movement, slide 9 extends beyond opening 10 and sets free the path between connections 13 and 14. Ball 11 simultaneously closes connection 15 and it rests upon seat 17. The second end positioning of the valve which is here unmistakably removed is safely determined and communicated by sensor aid 8.

In the exemplary embodiment of FIG. 2, a check strike valve is shown which consists of a small slide 20 in opening 21 and a closing ball 22 which is fixed in the shown position by means of a spring 23, that is, it is supported by a valve seat 24. With a prescribed pressure difference, the combination ball 22 and slide 20 is displaced downward. According to a path distance determined by slide 20, the check strike valve opens and connects entrance 25 with exit 26. Due to a rod 27 and a flat spring 29, a lever 28 moves in conjunction with check valve 20/22. Its position is determined and communicated by the sensor 30. In addition, another electromagnet is provided for, one which consists of a U-shaped yoke 31, a coil 32, and the lever 28 which serves as an armature. With activation of lever 28 the check valve 20/21 becomes actuated over rod 27 for controlling purposes. The movement is determined by the sensor and further communicated to a monitoring.

FIG. 3 shows a possible monitoring. A magnet valve coil which is controlled by an amplifier 34 is designated as 33. This magnet coil is activated via terminal 35. The sensor signal is introduced at terminal 36. This signal is given off by the sensor for example as an L-Signal whenever the parts 4/5 of FIG. 1 or part 28 of FIG. 2 respectively find themselves in at least a prescribed small distance from the sensor 8 or 30 respectively. Through the AND-gate 37 and 38 (with inversion) and the OR-gate 39, a warning light 40 is activated when either in spite of activation of coil 33, the sensor 8 or 30 respectively continues to issue L-Signals and accordingly the valve is not shifted, or when no sensor signal is given off although the valve has not been shifted, and accordingly parts 4/5 or 28 respectively ought to be close to the sensor.

What is claimed and desired to be secured by Letters Patent of the United States is:

1. A valve arrangement,
    said valve arrangement including a valve body adapted to assume at least two positions in a flow chamber for the purpose of controlling fluid flow through a fluid flow passage,
    a monitor means for monitoring said at least two positions of said valve arrangement for determining in which position said valve arrangement is positioned,
    a slide means secured to said valve body and movable in said fluid flow passage when said valve body is unseated from said fluid flow passage and moved to one of said at least two positions,
    said slide means closing said fluid flow passage against fluid flow until said slide means is free of said fluid flow passage.

2. A valve arrangement according to claim 1, characterized in that the valve arrangement is operated by a magnetic device which operates said valve slide and said valve body.

3. A valve arrangement according to claim 1, characterized in that the valve arrangement opens and closes said fluid flow passage due to dependence upon a pressure difference between said slide means and said valve body.

4. A valve arrangement according to claim 3 which includes an electromagnetically actuatable operating device which operates the valve.

5. A valve arrangement according to claim 2, characterized in that the operating device is separated from any fluid operated parts respectively and includes a rod which displaces the valve body and slide and which is actuated by the operating device.

6. A valve arrangement according to claim 4, characterized in that the operating device is separated from any fluid operated parts respectively and includes a rod which displaces the valve body and slide and which is actuated by the operating device.

* * * * *